(12) United States Patent
Rohs et al.

(10) Patent No.: US 6,227,976 B1
(45) Date of Patent: May 8, 2001

(54) TORSIONAL VIBRATION DAMPER

(76) Inventors: Ulrich Rohs, Roonstr. 11, 52351 Duren;
Dietmar Heidingsfeld,
Bodelschwingstr. 36, 52078 Aachen,
both of (DE)

( * ) Notice: Subject to any disclaimer, the term of this patent is extended or adjusted under 35 U.S.C. 154(b) by 0 days.

(21) Appl. No.: 09/226,379

(22) Filed: Jan. 6, 1999

(51) Int. Cl.⁷ ............... F16D 3/12; F16D 3/14; F16D 3/52; F16D 3/66
(52) U.S. Cl. .................. 464/66; 464/64; 464/68; 192/107 R
(58) Field of Search .................. 464/66, 64, 68; 267/280, 285, 169, 174; 192/107 R

(56) References Cited

U.S. PATENT DOCUMENTS

| | | | | |
|---|---|---|---|---|
| 1,258,639 | * | 3/1918 | Eaton | 464/64 |
| 1,284,268 | * | 11/1918 | Eaton | 464/64 |
| 2,321,941 | * | 6/1943 | Rose | 464/66 |
| 2,342,989 | * | 2/1944 | Ware | 464/64 |
| 2,674,863 | * | 4/1954 | Thelander | 464/66 |
| 2,984,091 | * | 5/1961 | Ludwig | 464/64 |
| 4,518,071 | * | 5/1985 | Nozawa | 464/64 |
| 5,657,845 | * | 8/1997 | Szadkowski et al. | 464/64 |

* cited by examiner

Primary Examiner—Robert J. Oberleitner
Assistant Examiner—Devon Kramer
(74) Attorney, Agent, or Firm—Thomas C. Saitta

(57) ABSTRACT

A torsional vibration damper having guides for tangentially mounted helical springs which extend into the springs far enough to prevent the spring from bending excessively in the radial direction when the device is exposed to centrifugal forces. The guides allow the springs to be mounted in recesses which are open in the outer radial direction.

17 Claims, 3 Drawing Sheets

TORSIONAL VIBRATION DAMPER

BACKGROUND OF THE INVENTION

The invention concerns a torsional vibration damper with at least one tangential spring on a disk, and more particularly concerns such devices wherein the spring is mounted in a window or recess open on the radially outward side, and wherein the device is provided with a guide member which extends internally within the spring to limit or prevent excessive bending in the radial direction when the spring is subjected to high centrifugal force.

Conventional torsional vibration dampers usually have several tangential springs at regular intervals that are held in windows of the primary part. These windows have radial sides between which the spring is clamped, and they have tangential sides of which the radially outmost side prevents the spring from bulging too much at high speeds. The spring is tightly held in the window so that it is kept from bending undesirably or slipping out from its mount even when centrifugal force is high.

The invention is based on the problem of developing the generic torsional vibration damper so that the spring is held in a different manner. This problem is solved in that the torsional vibration damper has a guide which extends far enough into the spring to prevent the spring from bending in a radial direction.

The guide according to the invention allows the spring to be located on the perimeter of a primary part or a secondary part of a torsional vibration damper to increase the torque that acts on the spring. The window does not have to be limited to the outside in a radial direction. With the spring mounted according to the invention, the radially interior parts of the spring press on the inside of the guide at high speeds to prevent excess radial bulging of the spring.

The advantage is that either the torsional vibration damper can have a smaller diameter, or its capability is increased by a spring with the same dimensions that may be positioned farther out radially.

It is particularly advantageous when the disk is a part of the secondary part. When the springs are on the secondary part, the spring guide according to the invention is particularly useful since, for design reasons, a window limit lying radially to the outside is not necessary. The spring can be affixed in a U-shaped recess to the disk of the secondary part, and the outside of the spring extends up to the radially outermost area of the disk.

In order to attach the guide to two opposing points on the disk, it is suggested that the guide extend across the entire length of the spring. Contact surfaces on the faces of the spring are suitable to hold the spring in a set position and allow several springs to be arranged coaxially.

The guide can be easily affixed by giving it an interlocking fit with the disk. However, depending on the use, it can be affixed by welding or plastic deformation such as upsetting. It is particularly advantageous when the guide can be clipped to the disk. It is suggested that the guide or a part of the guide be deformable. When the guide is deformable, it is easier to insert the disk and allows a snap-in fit.

Since the guide is to resist radially-acting centrifugal force resulting from its own mass and the mass of the spring, it is particularly advantageous when the guide can be deformed perpendicular to the plane of the disk during installation. Such a selective deformability makes it easier to install the guide, and the strength of the guide is not impaired by radially-acting force.

In one preferred exemplary embodiment, the guide has recesses in a projection that moves in a plane of the disk on opposing faces to interact with the disk. The guide can be made of a homogenous material, and different thicknesses of the parts of the guides can make it selectively deformable.

A preferred material for the guide is plastic since it allows economic manufacture and different elasticity and strengths.

Although the guide has been described as being deformable, especially to produce a snap-in fit, it is also possible to make the disk out of plastic or at least make it flexible so that a snap-in fit can be attained by deforming the disk.

SUMMARY OF THE INVENTION

The invention is an improved torsional vibration damper device comprising a disk member in which are tangentially mounted at least one and preferably plural helical springs. The springs are mounted in generally U-shaped recesses or windows having opposing sides to retain ends of the spring. The windows or recesses are open to the radially outward side, such that no limiting wall or cap is necessary for retention of the spring in the recess. Excessive bending of the spring during exposure to high centrifuigal forces is prevented or limited by providing a guide member which extends from each opposing face into the interior of the spring. The interior surface of the guide abuts the spring to prevent excessive radial bending. The guide preferably extends completely through the entire length of the spring between the opposing sides, and may have a concave interior surface. The guide may be formed of a deformable material, such as metal or plastic, such that a pressure or snap fit may be achieved between the guide and the opposing sides of the spring recess, which preferably has recesses of various configuration to receive the ends of the guide.

DETAILED DESCRIPTION OF THE INVENTION

With reference to the drawings, the invention will now be described in detail with regard for the best mode and the preferred embodiment.

FIGS. 1–5 show the secondary part 1, 2, 3, 4, 5, of a torsional vibration damper. Only one half of the secondary part is shown. The other half of the secondary part mirrors the first.

Figure 1:
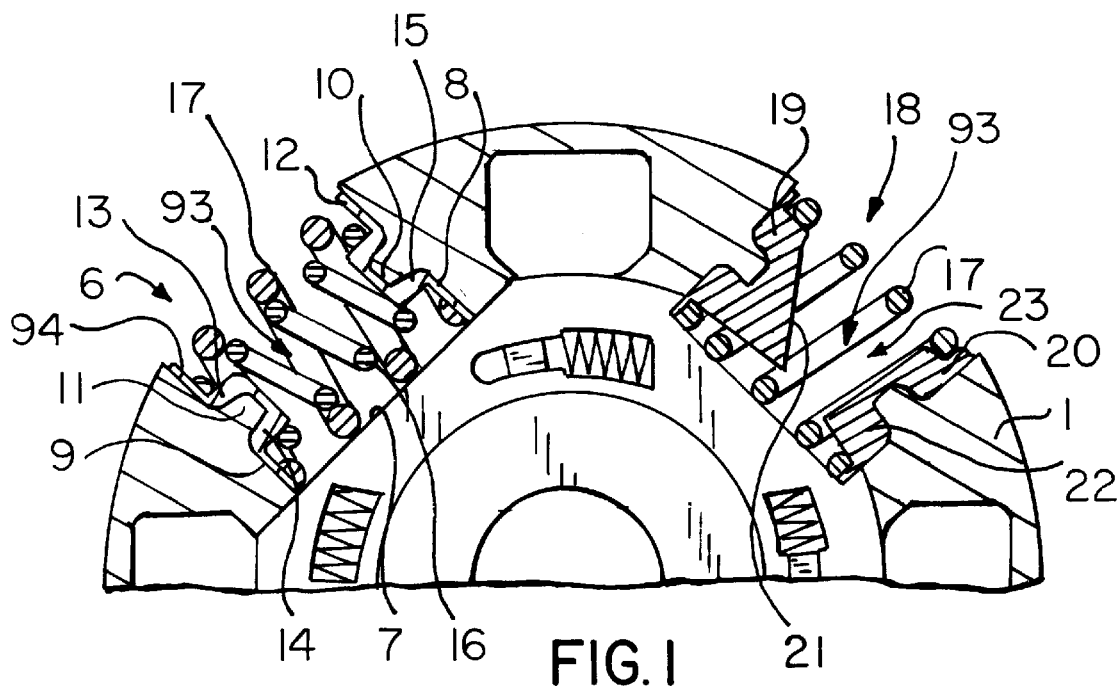
FIG. 1 is a cross-sectional view showing half of a disk with an embodiment having two guides that extend into the in different lengths.

The secondary part 1 in FIG. 1 has a first, essentially U-shaped window or recess 6 with a flat base surface 7 and two side surfaces 8 and 9 in which are located projecting elements 10, 11. These projecting elements 10, 11 hold contact surfaces 12, 13 that have circular elevation members 14, 15 that project to the inside of the U. A small helical spring 16 can be placed on the elevation member.

Concentric to the small spring 16 is a large helical spring 17 that abuts the contact surfaces 12, 13 and is tangential in the U-shaped window 6 of the disk 1. like the small spring 16.

In this exemplary embodiment, the circular elevation members 14, 15 extend slightly into the small spring 16 and only prevent the spring from bending radially against small radial force. When the radial force is greater, it is necessary for the circular elevation members 14, 15 to extend further into the spring to counteract the radial force acting on the springs.

Other contact surfaces 19, 20 are shown in the other U-shaped recess 18 in FIG. 1 where at least one of the circular elevation members 21, 22 extends further into the spring to prevent the spring from bulging radially primarily in the middle as a result of centrifugal force. There is a gap 23 between the elevation members 21, and 22 to make it easier to insert the spring. This makes it possible to design the elevation members 21 and 22 as one piece with the disk 1.

Figure 2:
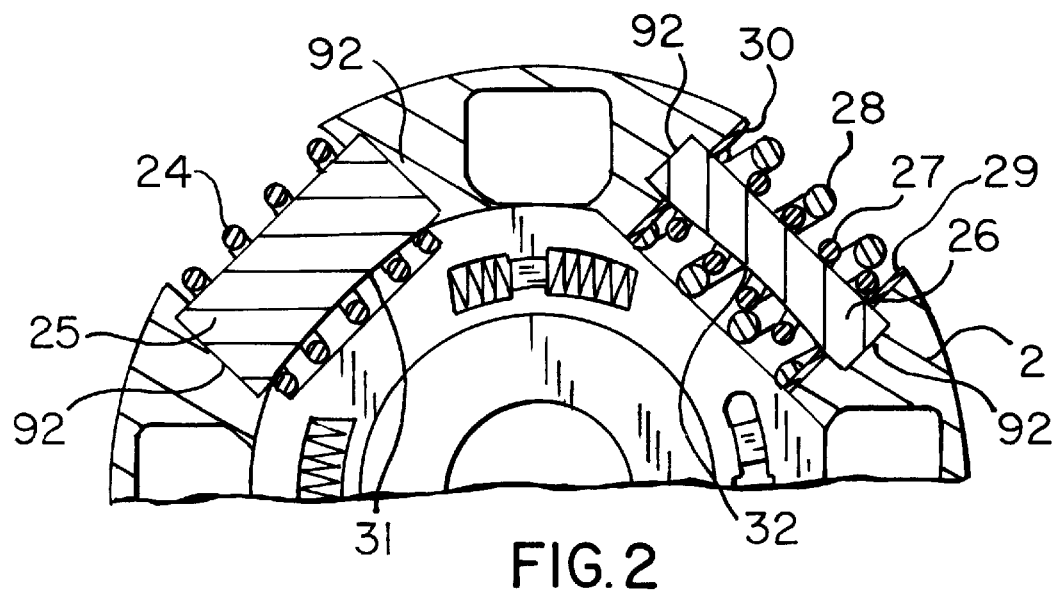
FIG. 2 is a similar view of a different embodiment, where two guides extend through the entire length of the spring.

In FIG. 2 on the left there is a guide 25 that extends the entire length of the spring 24, while on the right side, there is a corresponding guide 26 for coaxial springs 27, 28. The coaxial springs 27 and 28 extend between two contact surfaces 29, 30, and the individual spring 24 on the left side lies directly on the disk 2 of the secondary part.

Both guides 25, 26 have a concave surface 31, 32 on their radially interior side to allow the springs to bend on a circular arc. In practice, the springs are usually inserted slightly bulging to the outside and hence lie on the concave surface 31, 32 of the guide 25, 26.

Figure 3:
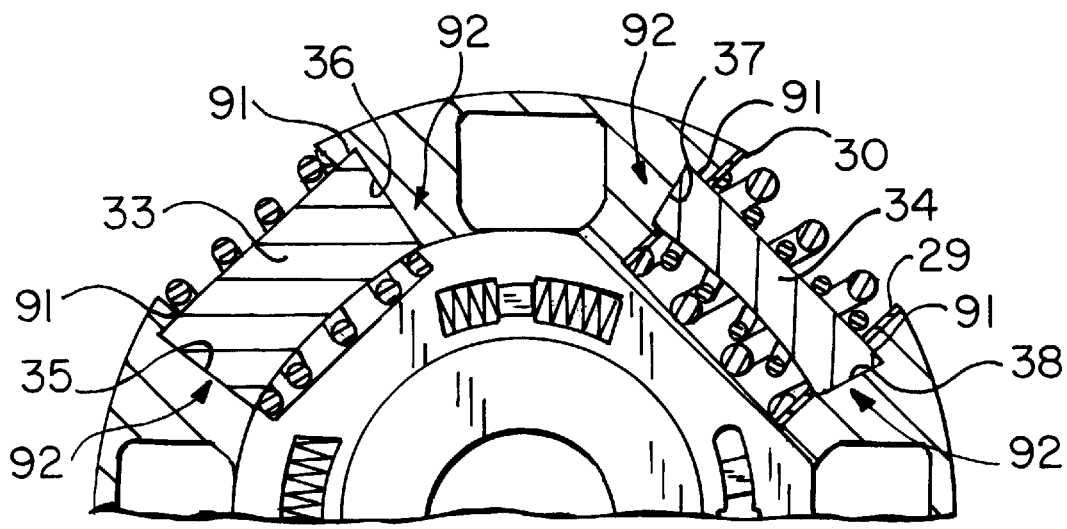
FIG. 3 is a similar view of still another embodiment, showing an alternate means to affix the spring guide.

FIG. 3 shows guides 33, 34 with faces 35, 36, 37, 38 at a sharp angle to each other that are inserted in the disk 3 so that force radiating outward is captured by the contact surfaces between the guide 33, 34 and the disk 3.

Figure 4:
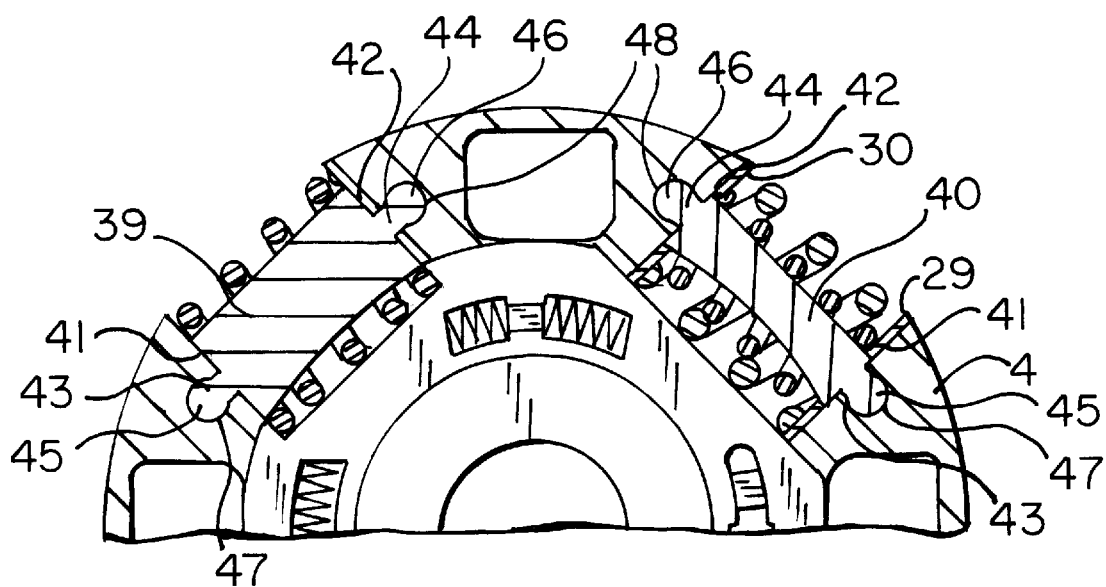
FIG. 4 a similar view of still another embodiment, showing another alternate means to affix the spring guide.

FIG. 4 shows another way to attach the guides 39, 40 to the disk 4. Attached to the faces 41, 42 of the guide 39 via bars 43, 44 are cylinders 45, 46 perpendicular to the disk 4 that are attached in corresponding recesses 47, 48 on the disk 4.

Figure 5:
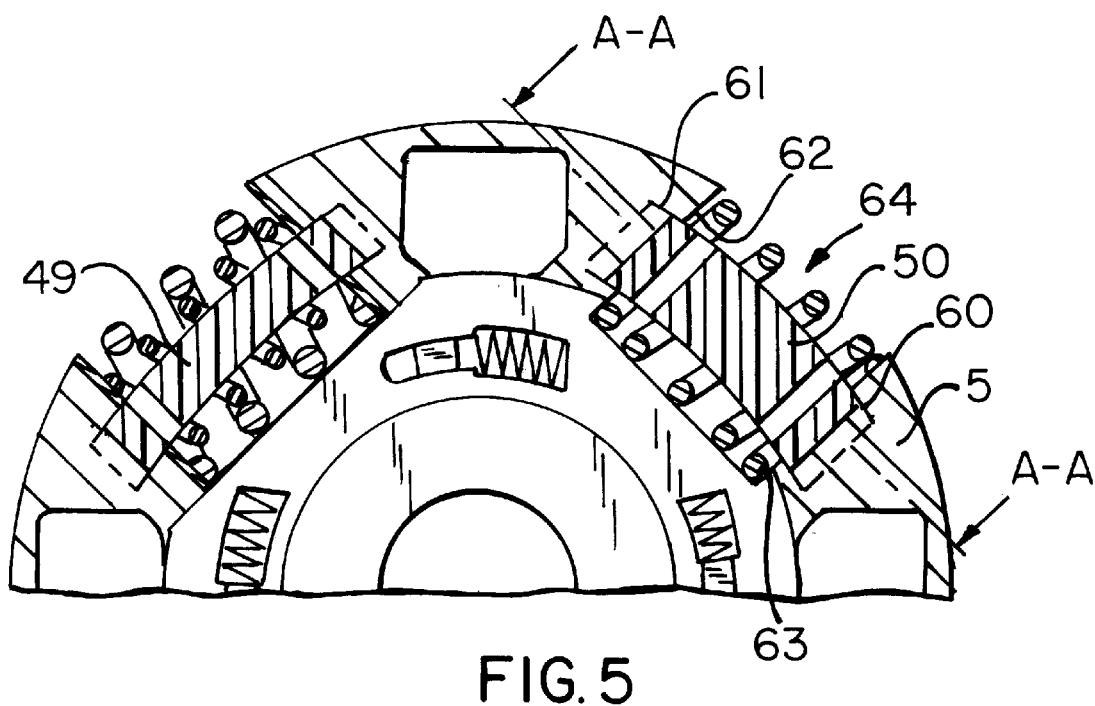
FIG. 5 a similar view of still another embodiment, showing clip attachment for a spring guide.
Figure 6:
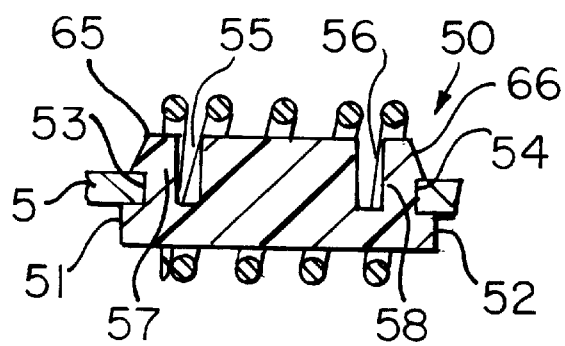
FIG. 6 a partial cross-sectional view of the snapped-in guide, taken along line A—A of FIG. 5.

FIG. 5 shows a particularly useful embodiment in which guides 49, 50 are attached to the disk 5 of the secondary part with snap-in locks. The shape of the guides can be seen from comparing FIGS. 5 and 6. There are recesses 53, in opposing faces 51, 52 of the guide 54 to allow interaction with the disk 5. Lateral cuts 55, 56 that extend behind the recesses 53, 54 produce projections 57, 58 between the recess and cut that move in the plane of the disk 5.

Figure 7:
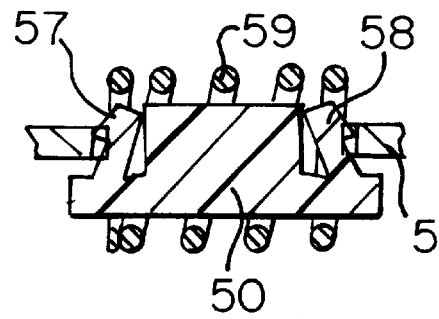
FIG. 7 is a partial cross-sectional view similar to FIG. 6, showing the guide during insertion into the disk.

The projections 57, 58 are shown moving in the plane of the disk 5 in FIG. 7. This movement makes it easy to insert the guide 50 with the spring 59 into the U-shaped recesses 60 and 61 at opposing sides 62, 63 of the U-shaped recess 64 in the disk 5.

The guides 49, 50 are preferably made of plastic so that the projections 57, 58 can bend. Beveled surfaces 65, 66 on the projections 57, 58 make it easier to insert the guide 50 in the recesses 60, 61 of the disk 5.

It is contemplated that certain equivalents or substitutions for elements set forth above may be obvious to those skilled in the art, and therefore the true scope and definition of the invention is to be as set forth in the following claims.

We claim:

1. In a torsional vibration damper having at least one tangential spring on a disk, said spring being subject to bending in the outward radial direction due to centrifugal force, the improvement comprising a straight guide member which extends into and completely through said spring to limit bending of said spring in the radial direction, said guide member comprising a concave recess surface disposed on the radially interior side, whereby said spring contacts and is limited by said concave recess surface when bent in the outward radial direction due to centrifugal force.

2. The damper of claim 1, where said guide is connected to said disk.

3. The damper of claim 3, where said guide is welded to said disk.

4. The damper of claim 3, where said guide is connected to said disk by plastic deformation.

5. The damper of claim 3, where said guide clips onto said disk.

6. The damper of claim 1, wherein said damper further comprises a generally U-shaped recess having opposing side surfaces for receiving said spring, said recess being not closed in the outward radial direction, further comprising recesses disposed within said side surfaces to receive said guide member.

7. The damper of claim 6, wherein said guide members further comprise non-parallel faces which are received by said side surface recesses.

8. The damper of claim 6, wherein said guide members further comprise cylinders mounted on neck members, whereby said cylinders are received by said side surface recesses.

9. The damper of claim 8, wherein said damper further comprises a central axis, and wherein said cylinders are disposed perpendicularly to said damper central axis.

10. The damper of claim 1, further comprising a second spring disposed coaxially with said at least one tangential spring.

11. In a torsional vibration damper comprising at least one helical spring mounted tangentially on a disk within a generally U-shaped recess having opposing side surfaces, said recess being not closed in the outward radial direction, where said spring is subject to excessive bending in the outward radial direction due to centrifugal force, the improvement comprising a guide member which extends from each said opposing side surface into and completely through said spring from one said opposing side surface to the other said opposing side surface to limit bending in the radial direction, and where said guide member comprises a pair of deformable projections and said opposing side surfaces each comprises a recess to receive said projections, whereby said guide is snap fit into said disk such that said side surface recesses receive said deformable projections.

12. The damper of claim 11, where said guide member has a concave recess surface on the radially interior side, whereby said spring contacts and is limited by said concave recess surface when bent in the outward radial direction due to centrifugal force.

13. The damper of claim 12, wherein said guide member further comprises a pair of lateral cuts to enable inward deforeation of said deformable projections.

14. In a torsional vibration damper comprising at least one helical spring mounted tangentially on a disk within a generally U-shaped recess having opposing side surfaces, said recess being not closed in the outward radial direction, where said spring is subject to excessive bending in the outward radial direction due to centrifugal force, the improvement comprising each of said opposing side surfaces comprising a pair of projecting elements which extend therefrom, each of said pair of projecting elements retaining thereon a guide member having a circular in cross-section stem member which extends into said spring but not completely through said spring to limit bending in the radial direction, said stem members in combination defining an unobstructed gap therebetween.

15. The damper of claim 14, further comprising a second helical spring mounted concentrically onto said at least one helical spring.

16. The damper of claim 14, wherein one said stem member extends farther into said spring than the other said stem member.

17. The damper of claim 14, wherein said guide members each further comprises a flange contact member surrounding said stem member, whereby said spring abuts said contact members.

* * * * *